US009869249B2

(12) United States Patent
Cigal et al.

(10) Patent No.: US 9,869,249 B2
(45) Date of Patent: Jan. 16, 2018

(54) SPEED SENSOR PROBE LOCATION IN GAS TURBINE ENGINE

(71) Applicant: UNITED TECHNOLOGIES CORPORATION, Hartford, CT (US)

(72) Inventors: Brian P Cigal, Windsor, CT (US); Todd A. David, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 936 days.

(21) Appl. No.: 13/837,236

(22) Filed: Mar. 15, 2013

(65) Prior Publication Data
US 2013/0199206 A1 Aug. 8, 2013

Related U.S. Application Data

(63) Continuation-in-part of application No. 13/368,677, filed on Feb. 8, 2012.
(Continued)

(51) Int. Cl.
*F02K 3/06* (2006.01)
*F02C 7/00* (2006.01)
(Continued)

(52) U.S. Cl.
CPC .............. *F02C 7/00* (2013.01); *F01D 17/06* (2013.01); *F02C 3/107* (2013.01); *F02K 3/06* (2013.01);
(Continued)

(58) Field of Classification Search
CPC ...... G01M 15/00; G01M 15/14; G01M 3/025; G01P 3/44; G01P 3/46; G01P 5/06; F02D 2009/023; F05B 2270/304
(Continued)

(56) References Cited

U.S. PATENT DOCUMENTS 4,075,562 A 2/1978 Karstensen et al.
4,716,723 A 1/1988 Ralston et al.
(Continued)

FOREIGN PATENT DOCUMENTS

EP 1918527 5/2008

OTHER PUBLICATIONS

International Preliminary Report on Patentability for PCT Application No. PCT/US2012/071553 dated Aug. 14, 2014.
(Continued)

*Primary Examiner* — Steven Sutherland
(74) *Attorney, Agent, or Firm* — Carlson, Gaskey & Olds, P.C.

(57) ABSTRACT

A gas turbine engine includes a fan, a fan drive gear system coupled to drive the fan about an engine central axis, a compressor section including a first compressor and a second compressor and a turbine section. The turbine section includes a first turbine coupled to drive a first spool. The first spool is coupled at a first axial position to a compressor hub that is coupled to drive the first compressor. The first spool is also coupled at a second, different axial position to a fan drive input shaft that is coupled to drive the fan drive gear system. The turbine section also includes a second turbine coupled through a second spool to drive the second compressor. A sensor probe is operable to determine a rotational speed of the first spool. The sensor probe is located at a third axial position that is axially forward of the first axial position and axially aft of the second axial position.

11 Claims, 3 Drawing Sheets

Related U.S. Application Data

(60) Provisional application No. 61/593,177, filed on Jan. 31, 2012.

(51) Int. Cl.
*G01P 3/44* (2006.01)
*F01D 17/06* (2006.01)
*F02C 3/107* (2006.01)
*F02D 9/02* (2006.01)

(52) U.S. Cl.
CPC .......... *G01P 3/44* (2013.01); *F02D 2009/023* (2013.01); *Y02T 50/671* (2013.01); *Y10T 29/49229* (2015.01)

(58) Field of Classification Search
USPC .......................................................... 60/792
See application file for complete search history.

(56) References Cited

U.S. PATENT DOCUMENTS

| | | | |
|---|---|---|---|
| 4,827,712 A * | 5/1989 | Coplin | ............... 60/226.1 |
| 4,854,120 A | 8/1989 | Nelson et al. | |
| 5,067,355 A * | 11/1991 | Witte | ............... 73/862.326 |
| 6,176,074 B1 | 1/2001 | Thompson et al. | |
| 6,321,525 B1 | 11/2001 | Rogers | |
| 6,393,355 B1 | 5/2002 | Muramatsu | |
| 7,188,475 B2 | 3/2007 | McGinley | |
| 7,694,505 B2 | 4/2010 | Schilling | |
| 2004/0187473 A1 | 9/2004 | Rowe | |
| 2005/0200349 A1 | 9/2005 | Duke | |
| 2005/0217274 A1 | 10/2005 | Muramatsu et al. | |
| 2007/0055435 A1 | 3/2007 | Muramatsu et al. | |
| 2009/0007569 A1* | 1/2009 | Lemmers et al. | ............... 60/792 |
| 2009/0110545 A1 | 4/2009 | Davis et al. | |
| 2010/0000222 A1 | 1/2010 | Price et al. | |
| 2010/0058735 A1 | 3/2010 | Hurwitz et al. | |
| 2010/0324799 A1 | 12/2010 | Davison | |
| 2011/0286836 A1 | 11/2011 | Davis | |
| 2012/0195753 A1 | 8/2012 | Davis et al. | |

OTHER PUBLICATIONS

Gunston: "Jane's Aero-Engines," Pratt & Whitney/USA, Mar. 2000, JAEng-Issue 7, Copyright 2000 by Jane's Information Group Limited, pp. 510-512.

International Search Report and Written Opinion for International Application No. PCT/US2014/023209 dated Jul. 10, 2014.

European Supplementary Search Report for EP Patent Application No. 12867609.5 completed Oct. 28, 2015.

International Preliminary Report on Patentability for PCT Application No. PCT/US2014/023209 dated Sep. 24, 2015.

Singapore Search Report for Singapore Patent Application No. 11201402816R dated Apr. 7, 2015.

International Search Report for PCT Application No. PCT/US12/071553 completed on Jan. 17, 2013.

* cited by examiner

SPEED SENSOR PROBE LOCATION IN GAS TURBINE ENGINE

CROSS-REFERENCE TO RELATED APPLICATION

This application is a continuation in part of co-pending U.S. patent application Ser. No. 13/368,677 filed Feb. 8, 2012, which claims priority to U.S. Provisional Patent Application No. 61/593,177, filed Jan. 31, 2012.

BACKGROUND

This disclosure relates to gas turbine engines and, more particularly, to the location of a speed sensor probe in a gas turbine engine.

A typical turbofan engine includes a compressor section and a turbine section that is coupled to drive the compressor section and a fan of the engine. In a two-spool engine design, a high pressure turbine is coupled through a high spool to drive a high pressure compressor and a low pressure turbine is coupled through a low spool to drive a low pressure compressor. Typically, a probe is mounted in the engine to determine the speed of at least one of the spools. One challenge in determining the location of the probe in the engine includes packaging concerns with regard to the engine architecture. Another challenge is to mount the speed sensor probe in a location that can detect or mitigate certain engine events can cause an over-speed condition.

SUMMARY

A gas turbine engine according to an example of the present application includes a fan, a fan drive gear system coupled to drive the fan about an engine central axis, a compressor section including a first compressor and a second compressor, and a turbine section. The turbine section includes a first turbine coupled to drive a first spool. The first spool is coupled at a first axial position to a compressor hub that is coupled to drive the first compressor and the first spool is coupled at a second, different axial position to a fan drive input shaft that is coupled to drive the fan drive gear system. A second turbine is coupled through a second spool to drive the second compressor. A sensor probe is operable to determine a rotational speed of the first spool. The sensor probe is located at a third axial position that is axially forward of the first axial position and axially aft of the second axial position.

A further embodiment of any of the foregoing embodiments includes a fan output shaft coupled to be rotated by the fan drive gear system and coupled at a fourth axial position to the fan, the fourth axial position being distinct from the first axial position and the second axial position, and wherein the fourth axial position is forward of the second axial position the third axial position.

In a further embodiment of any of the foregoing embodiments, the compressor section is axially aft of the fan drive gear system.

In a further embodiment of any of the foregoing embodiments, the first compressor has three stages.

In a further embodiment of any of the foregoing embodiments, the first turbine has a maximum rotor diameter D1 and the fan has a fan diameter D2 such that a ratio D1/D2 is less than 0.6.

In a further embodiment of any of the foregoing embodiments, the sensor probe is stationary relative to the first spool.

A further embodiment of any of the foregoing embodiments includes at least one sensor target coupled to rotate with the first spool.

A further embodiment of any of the foregoing embodiments includes a controller in communication with the sensor probe, the controller is operable to cease a fuel supply to a combustor in response to a rotational speed of the first spool exceeding a predetermined threshold rotational speed.

In a further embodiment of any of the foregoing embodiments, the controller is a full authority digital engine control.

In a further embodiment of any of the foregoing embodiments, the fan drive gear system is an epicyclic gear system.

In a further embodiment of any of the foregoing embodiments, the fan drive gear system includes a planetary gear having a gear reduction ratio greater than about 2.3:1.

In a further embodiment of any of the foregoing embodiments, the fan drive gear system includes a planetary gear having a gear reduction ratio greater than about 2.5:1.

In a further embodiment of any of the foregoing embodiments, the first compressor has three stages, the first turbine has a maximum rotor diameter D1 and the fan has a fan diameter D2 such that a ratio D1/D2 is less than 0.6, and the fan drive gear system includes a planetary gear having a gear reduction ratio greater than about 2.3:1.

In a further embodiment of any of the foregoing embodiments, the fan drive gear system provides a speed reduction from the first spool to the fan.

In a further embodiment of any of the foregoing embodiments, the fan and the compressor section define a bypass ratio that is greater than about 6.

A method of assembling a gas turbine engine according to an example of the present disclosure includes affixing a sensor probe that is operable to determine a rotational speed of the first spool at an axial location that is axially forward of the first axial position and axially aft of the second axial position.

A further embodiment of any of the foregoing embodiments includes, prior to affixing the speed sensor probe, removing a used speed sensor probe from the gas turbine engine such that the affixed speed sensor probe replaces the used speed sensor probe.

A method of operating a gas turbine engine according to an example of the present disclosure includes determining a rotational speed of the first spool at an axial location that is axially forward of the first axial position and axially aft of the second axial position, and changing a fuel supply to a combustor of the gas turbine engine in response to the rotational speed exceeding a predetermined threshold rotational speed.

A further embodiment of any of the foregoing embodiments includes ceasing the fuel supply in response to the rotational speed exceeding the predetermined threshold rotational speed.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
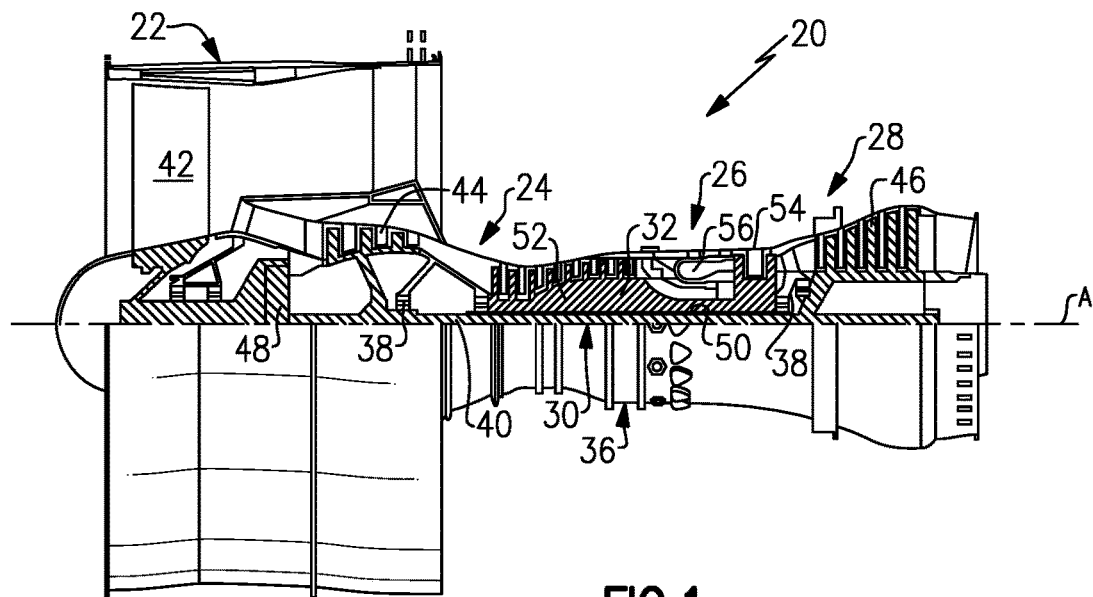
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. In the example shown, the first compressor 44 has three stages. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

In a further example, the engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. In a further embodiment, the first turbine 46 has a maximum rotor diameter D1 (FIG. 2) and the fan 42 has a fan diameter D2 such that a ratio of D1/D2 is less than about 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second.

Figure 2:
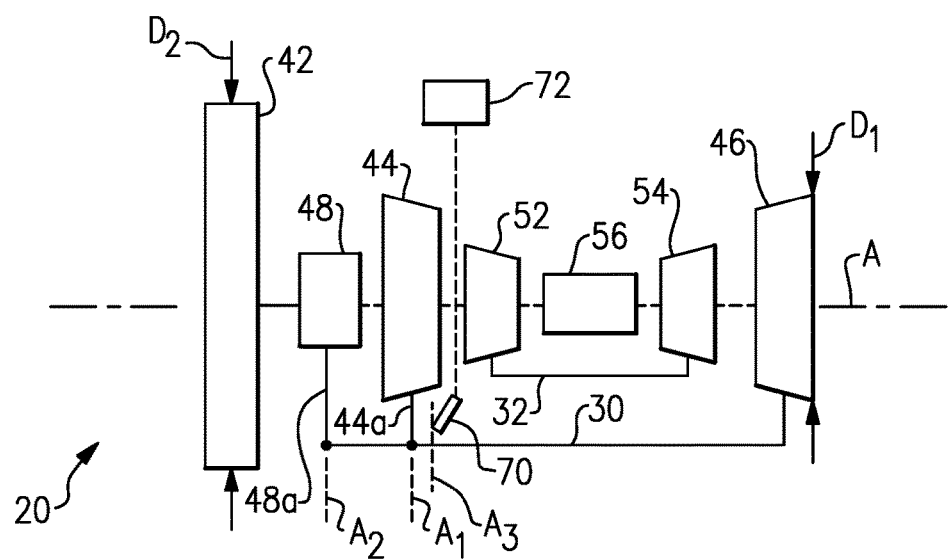
FIG. 2 schematically illustrates the gas turbine engine of FIG. 1.

FIG. 2 schematically illustrates selected components of the above-described gas turbine engine 20. As shown, the first spool 30 is coupled at a first axial position $A_1$ to a compressor hub 44a that is coupled to drive the first compressor 44. The first spool 30 is also coupled at a second axial position $A_2$ to a fan drive gear system input coupling 48a to drive the gear assembly of the fan drive gear system 48. For example, the input coupling 48a can be the mechanical fuse location or spline location. The gas turbine engine 20 further includes a speed sensor probe 70 that is operable to determine a rotational speed of the first spool 30. The speed sensor probe 70 is located at an axial position $A_3$ that is axially aft of the first axial position $A_1$ and the second axial position $A_2$, and the speed sensor probe 70 is fixed or stationary relative to the first spool 30. In this example, the axial position $A_3$ is also forward of the second compressor 52 and annular combustor 56 and axially aft of the first compressor 44. It is to be understood that relative positional terms, such as "forward," "aft," "upper," "lower," "above," "below," and the like are relative to the normal operational attitude of the gas turbine engine 20 and should not be considered otherwise limiting.

The location of the speed sensor probe at the axial position $A_3$ ensures that that gas turbine engine 20 will be protected from an over-speed condition in the event that either of the first compressor 44 or the fan drive gear system 48 becomes decoupled from the first spool 30. For example, if the compressor hub 44a or the fan drive gear system input coupling 48a fail, there will be a reduction in driven mass that causes the rotational speed of the first spool 30 to increase. If the speed increase is too great, the first turbine 46 can be damaged or fail. By locating the speed sensor probe 70 at the axial position $A_3$ that is axially aft of the first axial position $A_1$ and the second axial position $A_2$, the actual over-speed condition of the first spool 30 can be detected in an event that causes decoupling. In comparison, if a speed sensor probe was positioned forward of axial position $A_2$, the speed sensor probe would not be able to properly detect an over-speed condition caused by the first spool 30 becoming decoupled at the compressor hub 44a or fan drive gear system input coupling 48a because the speed sensor probe would be reading the rotational speed from a decoupled component. Thus, the reading would not reflect the actual speed of the first spool 30.

In a further example, the speed sensor probe 70 is in communication with a controller 72, such as a full authority digital engine control. The speed sensor probe 70 generates a signal that is proportional to the detected speed of the first spool 30 and sends the signal to the controller 72. In one example method, in response to detecting a rotational speed that exceeds a predetermined threshold rotational speed (i.e., an over-speed condition), the controller 72 changes (e.g., decreases) a fuel supply to the annular combustor 56. In a further example, in response to the over-speed condition, the controller 72 ceases the fuel supply to the combustor 56. By decreasing or ceasing the fuel supply to the combustor 56, less energy is provided to the first turbine 46. As a result, the speed of the first turbine 46 and first spool 30 decreases.

Figure 3:
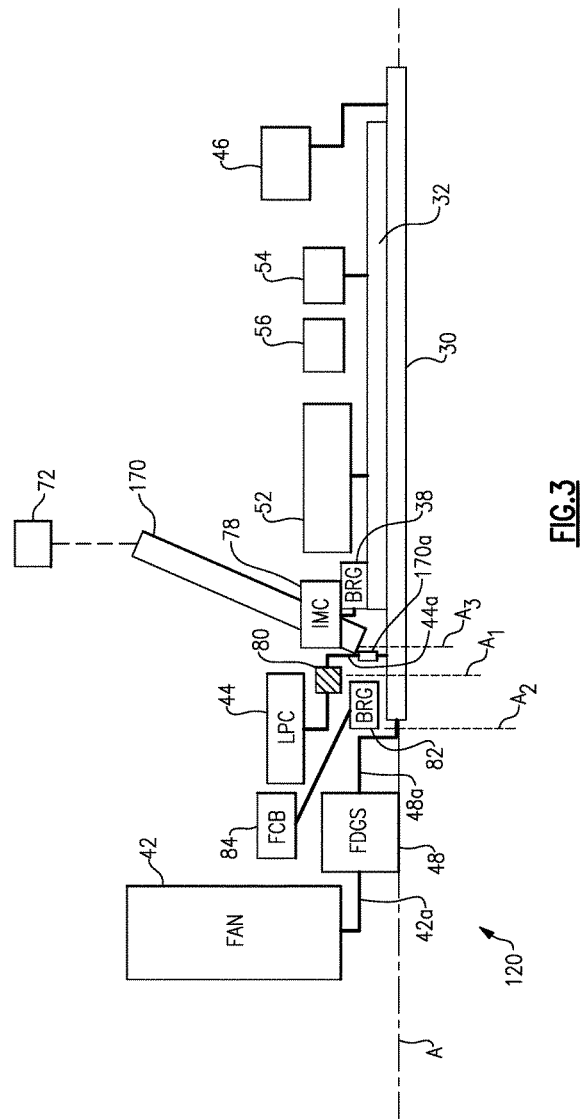
FIG. 3 illustrates a portion of a gas turbine engine that includes a speed sensor probe.

FIG. 3 illustrates selected portions of another example gas turbine engine 120 that has a similar engine architecture as the gas turbine engine 20 of FIGS. 1 and 2. In this example, the first spool 30 is coupled at the first axial position $A_1$ to the compressor hub 44a, which is coupled to drive the first compressor 44. The first spool 30 is also coupled at the second axial position $A_2$ to the fan drive gear system input coupling 48a, which is coupled to drive the fan drive gear system 48. A fan output shaft 42a is coupled to be rotated by the fan drive gear system 48 to drive the fan 42. A speed sensor probe 170 is located at the third axial position $A_3$ that is axially aft of the first axial position $A_1$ and the second axial position $A_2$. The speed sensor probe 170 is mounted to and accessible through an intermediate case 78.

At least one sensor target 170a is coupled to rotate with the first spool 30. In one example, the at least one sensor target 170a includes a plurality of sensor targets 170a. In an embodiment, the sensor target 170a includes slots or teeth such that rotation of the slots or teeth can be detected by a detector in the speed sensor probe 170. The detector can be a hall-effect sensor, a laser sensor, an optical sensor or the like that is capable of detecting the rotation of the slots or teeth. The speed sensor probe 170 generates a signal that is proportional to the detected speed and sends the signal to the controller 72.

In this example, the first spool 30 is coupled to the compressor hub 44a at a splined connection 80, which also defines the first axial position $A_1$. The first spool 30 is supported by a bearing 82, which is fixed relative to front center body case 84 and positions the first spool 30 relative to the engine central axis A. The fan drive gear system input coupling 48a extends forward from the bearing 82 and is coupled at its forward end to the fan drive gear system 48. Rotation of the first spool 30 drives the fan drive gear system input coupling 48a, which drives the fan drive gear system 48.

As described above, decoupling of the first compressor 44 at the compressor hub 44a from the first spool 30 or decoupling of the fan drive gear system input coupling 48a from the first spool 30 reduces the driven mass of the first spool 30 and first turbine 46. By positioning the speed sensor probe 170 at axial position $A_3$ axially aft of axial position $A_1$ and axial position $A_2$, an over-speed condition can be properly determined.

In this example, in a decoupling event at the compressor hub 44a or the fan drive gear system input coupling 48a, the bearing 82 maintains the position of the first spool 30 with regard to the engine central axis A. Thus, the first spool 30 continues to rotate in the decoupling event. In comparison, if the first spool 30 decouples at a position that is axially aft of axial position $A_1$, the bearing 82 would not maintain the axial alignment of the first spool 30. The first spool 30 would misalign such that rotating and static hardware would mesh to slow or stop the rotation of the first spool 30 and first turbine 46. Thus, there is no need to locate the speed center probe 170 farther axially aft of the axial positions $A_1$ and $A_2$. Moreover, locating the speed sensor probe 170 forward of axial positions $A_1$ and $A_2$ would not enable the speed sensor probe 170 to properly detect the actual speed of the first spool 30 should a decoupling event occur at the compressor hub 44a or the fan drive gear system input coupling 48a.

In a further example, the location of the speed sensor probe 70 at the axial position $A_3$ also facilitates assembly of the gas turbine engine 20/120, maintenance and the like. An example method of assembling the gas turbine engine 20/120 includes affixing the speed sensor probe 70/170 at the axial position $A_3$ that is axially aft of the first axial position $A_1$ and the second axial position $A_2$. For instance, the speed sensor probe 70/170 is periodically replaced in the gas turbine engine 20/120 as regular maintenance or if the speed sensor probe 70/170 becomes damaged. Thus, the used speed sensor probe 70/170 is removed and a new speed sensor probe 70/170 is affixed as a replacement.

In a further example, the speed sensor probe 70/170 is affixed at axial position $A_3$ using fasteners, such as bolts. In a replacement operation, the used speed sensor probe 70/170 is removed by electrically disconnecting the speed sensor probe 70/170 and removing the fasteners. Once removed, the new speed sensor probe 70/170 is installed into position, the fasteners are tightened and the new speed sensor probe 70/170 is electrically connected. In one further example, the axial position $A_3$ of the speed sensor probe 70/170 is accessible through one or more cowl doors.

Figure 4:
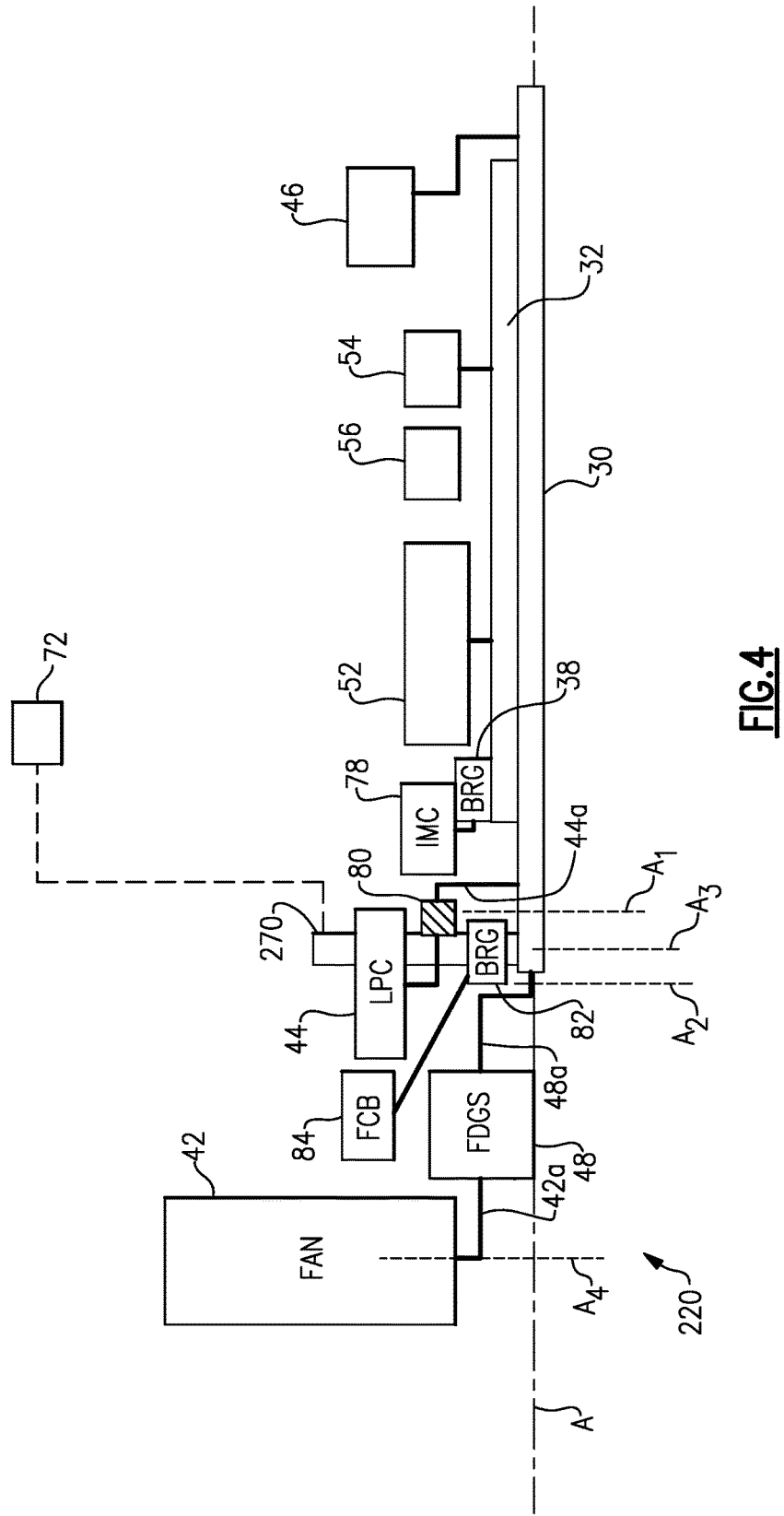
FIG. 4 illustrates selected portions of another example gas turbine engine with a different sensor probe location.

FIG. 4 illustrates selected portions of another example gas turbine engine 220 that has a similar engine architecture as the gas turbine engine 20 of FIGS. 1 and 2. In this example, sensor probe 270 is in a different axial location than the sensor probe 70/170. Similar to sensor probes 70/170, the sensor probe 270 is axially aft of the second axial position $A_2$. Unlike sensor probes 70/170, the sensor probe 270 is axially forward of the first axial position $A_1$. As can be appreciated, a sensor target, similar to sensor target 170a can be coupled to rotate with the first spool 30. The sensor probe 270 generates a signal that is proportional to the detected speed and sends the signal to the controller 72. Additionally, any of the sensors probes 70/170/270 can be timing sensors that generate one or more signals per revolution of the first spool 30 that can be used to determine speed.

The fan output shaft 42a is coupled at a fourth axial position $A_4$ to the fan 42. The fourth axial position $A_4$ is forward of the second axial position $A_2$ and the third axial position $A_3$. As can also be appreciated from the drawings, the compressor section 24 is axially aft of the fan drive gear system 48 and the axial positions are distinct from one another.

The location of the speed sensor probe at the axial position $A_3$ ensures that that gas turbine engine 20 will be protected from an over-speed condition in the event that either of the first compressor 44 or the fan drive gear system 48 becomes decoupled from the first spool 30.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a fan;
   a fan drive gear system coupled to drive the fan about an engine central axis;
   a compressor section including a first compressor and a second compressor;
   a turbine section including:
      a first turbine coupled to drive a first spool, the first spool being coupled at a first axial position to a compressor hub that is coupled to drive the first compressor and the first spool being coupled in a splined connection at a second, different axial position to a fan drive input shaft that is coupled to drive the fan drive gear system, and
      a second turbine coupled through a second spool to drive the second compressor; and
   a sensor probe operable to determine a rotational speed of the first spool, the sensor probe being located at a third axial position that is axially forward of the first axial position and axially aft of the second, different axial position.

2. The gas turbine engine as recited in claim 1, further comprising a fan output shaft coupled to be rotated by the fan drive gear system and coupled at a fourth axial position to the fan, the fourth axial position being distinct from the first axial position and the second axial position, and wherein the fourth axial position is forward of the second axial position and the third axial position.

3. The gas turbine engine as recited in claim 1, wherein the compressor section is axially aft of the fan drive gear system.

4. The gas turbine engine as recited in claim 1, wherein the first compressor has three stages.

5. The gas turbine engine as recited in claim 1, wherein the first turbine has a maximum rotor diameter D1 and the fan has a fan diameter D2 such that a ratio D1/D2 is less than 0.6.

6. The gas turbine engine as recited in claim 1, wherein the sensor probe is stationary relative to the first spool.

7. The gas turbine engine as recited in claim 1, including at least one sensor target coupled to rotate with the first spool.

8. The gas turbine engine as recited in claim 1, including a controller in communication with the sensor probe, the controller being operable to cease a fuel supply to a combustor in response to a rotational speed of the first spool exceeding a predetermined threshold rotational speed.

9. The gas turbine engine as recited in claim 8, wherein the controller is a full authority digital engine control.

10. The gas turbine engine as recited in claim 1, wherein the fan drive gear system is an epicyclic gear system.

11. The gas turbine engine as recited in claim 1, wherein the fan drive gear system provides a speed reduction from the first spool to the fan.

* * * * *